(12) United States Patent
Simpson et al.

(10) Patent No.: US 7,304,983 B2
(45) Date of Patent: Dec. 4, 2007

(54) METHODS AND SYSTEMS FOR ENHANCING INTERNET CALL-WAITING MESSAGES

(75) Inventors: Anita Hogans Simpson, Decatur, GA (US); Darryl Cynthia Moore, Conyers, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 1041 days.

(21) Appl. No.: 10/113,698

(22) Filed: Mar. 30, 2002

(65) Prior Publication Data

US 2004/0109409 A1 Jun. 10, 2004

(51) Int. Cl.
*H04L 12/66* (2006.01)
*H04L 12/28* (2006.01)
*H04M 11/00* (2006.01)
*H04M 1/56* (2006.01)

(52) U.S. Cl. .................. 370/352; 370/389; 379/93.35; 379/142.08

(58) Field of Classification Search ............... 379/67.1, 379/68, 88.22, 93.24, 93.35, 142.08, 142.1, 379/142.11, 215.01, 142.06; 370/352, 412, 370/426, 410

See application file for complete search history.

(56) References Cited

U.S. PATENT DOCUMENTS

| | | | | |
|---|---|---|---|---|
| 5,805,587 A | * | 9/1998 | Norris et al. ............... | 370/352 |
| 5,907,604 A | * | 5/1999 | Hsu ....................... | 379/142.06 |
| 6,078,581 A | | 6/2000 | Shtivelman | |
| 6,144,644 A | * | 11/2000 | Bajzath et al. ............. | 370/259 |
| 6,253,249 B1 | | 6/2001 | Belzile | |
| 6,259,692 B1 | | 7/2001 | Shtivelman | |
| 6,304,565 B1 | * | 10/2001 | Ramamurthy ............... | 370/352 |
| 6,373,817 B1 | * | 4/2002 | Kung et al. ................. | 370/217 |
| 6,724,872 B1 | * | 4/2004 | Moore et al. ............. | 379/93.35 |
| 6,724,878 B2 | * | 4/2004 | Burg ..................... | 379/215.01 |
| 6,775,370 B2 | * | 8/2004 | Burg ..................... | 379/215.01 |
| 6,950,402 B2 | * | 9/2005 | Mishra ...................... | 370/252 |

* cited by examiner

Primary Examiner—Hanh Nguyen
(74) Attorney, Agent, or Firm—Scott P. Zimmerman, PLLC; Geoff Sutcliffe; Jodi Hartman (57) ABSTRACT

Methods and systems are disclosed for notifying a called station of an incoming call. The called station has a busy status as a result of a connection to a data network via an access server. Because the called station is connected to the data network, and thus "busy," the method receives an Internet Call-Waiting message from the access server. The Internet Call-Waiting message includes information representing the telephone number of a calling station. The method queries for additional information representing the calling station, and the method presents the telephone number and the additional information to a user at the called station. The telephone number and the additional information notify the called station of the incoming call.

18 Claims, 9 Drawing Sheets

METHODS AND SYSTEMS FOR ENHANCING INTERNET CALL- WAITING MESSAGES

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to computers and telephony and, more particularly, to methods and systems for allowing a computer user to customize and to enhance Internet Call-Waiting message notifications.

2. Description of the Related Art

Internet Call-Waiting messages alert a user of an incoming call. When a telephone customer establishes a dial-up connection to a data network, such as the Internet, the customer's telephone line assumes a busy status. If a caller places a call to the customer, the caller ordinarily receives a "busy" signal. If, however, the customer subscribes to an Internet Call-Waiting service, the customer will receive a notification of the incoming call. This notification, typically termed an "Internet Call-Waiting Message," is displayed on the customer's computer video and alerts the computer-using customer of the incoming call. The notification often identifies the calling telephone number and, perhaps, the listed name of the telephone number. The computer-using customer then has the option of accepting the incoming call.

These Internet Call-Waiting messages, however, are limited in their informational content. Internet Call-Waiting messages currently offer the computer-using customer very few options when an incoming call is detected. The computer-using customer, for example, may send the call into voicemail. The computer-using customer may, alternatively, forward the call to another telephone number, such as a cellular phone number. The computer-using customer may also have the option of placing the incoming call in a "hold" status. The computer-using customer could also terminate the dial-up connection to the data network and accept the incoming telephone call. These call options, however, offer little to no informational content. The computer-using customer only knows the telephone number of the calling party and, perhaps, the listed name of the telephone number. The computer-using customer currently is offered no other information concerning the calling party.

There is, accordingly, a need in the art for Internet Call-Waiting customers/subscribers to quickly and to easily obtain more information concerning the calling party, a need for simple and easy-to-use methods of acquiring more information about the calling party, a need for an enhanced Internet Call-Waiting message platform that appeals to subscribing customers, and a need for enhanced Internet Call-Waiting features that are easily and inexpensively implemented by local exchange carriers.

BRIEF SUMMARY OF THE INVENTION

The aforementioned problems are reduced by an Internet Call-Waiting Client Module. The Internet Call-Waiting Client Module comprises computer programs, computer systems, and telecommunications systems that allow a subscriber to customize Internet Call-Waiting messages. When an Internet Call-Waiting message is received, the subscriber may augment and enhance the message with additional information representing the calling party or the calling device. The Internet Call-Waiting Client Module then allows the subscriber to save the additional information. The additional information could be locally stored on a computer or remotely stored on a data network. The next time an Internet Call-Waiting message is received from the same calling party, the Internet Call-Waiting Client Module retrieves the additional information and visually and/or audibly presents the additional information.

One aspect of the present invention describes a method of notifying a called station of an incoming call. The term "called station" shall hereinafter refer to both the called party and to the terminal equipment of the called party. The term "calling station" shall hereinafter refer to both the calling party and the calling telephonic equipment. The called station is busy as a result of a connection to a data network via an access server. The method receives an Internet Call-Waiting message from the access server. The Internet Call-Waiting message includes information representing a telephone number of a calling party. The method queries for additional information representing the calling party. The telephone number and the additional information may be visually and/or audibly presented at the called station, with the telephone number and the additional information notifying the called station of the incoming call.

The additional information could be selected by a user of the called station. The additional information, for example, could include an e-mail address associated with the calling party. When the method queries a local memory device, or the data network, for the additional information, the e-mail address could be retrieved and presented to the user at the called station. When the Internet Call-Waiting message is received, both the telephone number and the e-mail address could be visually and/or audibly presented to the user. The additional information could also include other information associated with the calling party, such as a physical address, a picture file, a birthday, a name of spouse/partner, and the names of any children. The additional information could also include personal preferences associated with the calling party, the date of a previous phone call received from the calling party, the time of a previous phone call received from the calling party, and notes of previous conversations with the calling party.

Another aspect of the present invention describes another method. This method receives an Internet Call-Waiting message from an access server. The Internet Call-Waiting message indicates an incoming call to the called station, for the called station is busy as a result of a connection to a data network via the access server. The Internet Call-Waiting message includes information representing a telephone number of a calling party. The method allows a user of the called station to augment the Internet Call-Waiting message with additional information representing the calling party, and allows the user to save the additional information for future retrieval.

Still another aspect of the present invention describes a system. This system comprises a processor and an Internet Call-Waiting Client Module stored in memory. The Internet Call-Waiting Client Module receives notification of an incoming call. The Internet Call-Waiting Client Module causes a query to be sent to a local memory device, or to the data network, for additional information associated with the calling party. The Internet Call-Waiting Client Module presents the additional information to the called station. The additional information notifies the user of the incoming call. The processor is capable of processing the additional information and of presenting the additional information.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein.

DETAILED DESCRIPTION OF THE INVENTION

Figure 1:
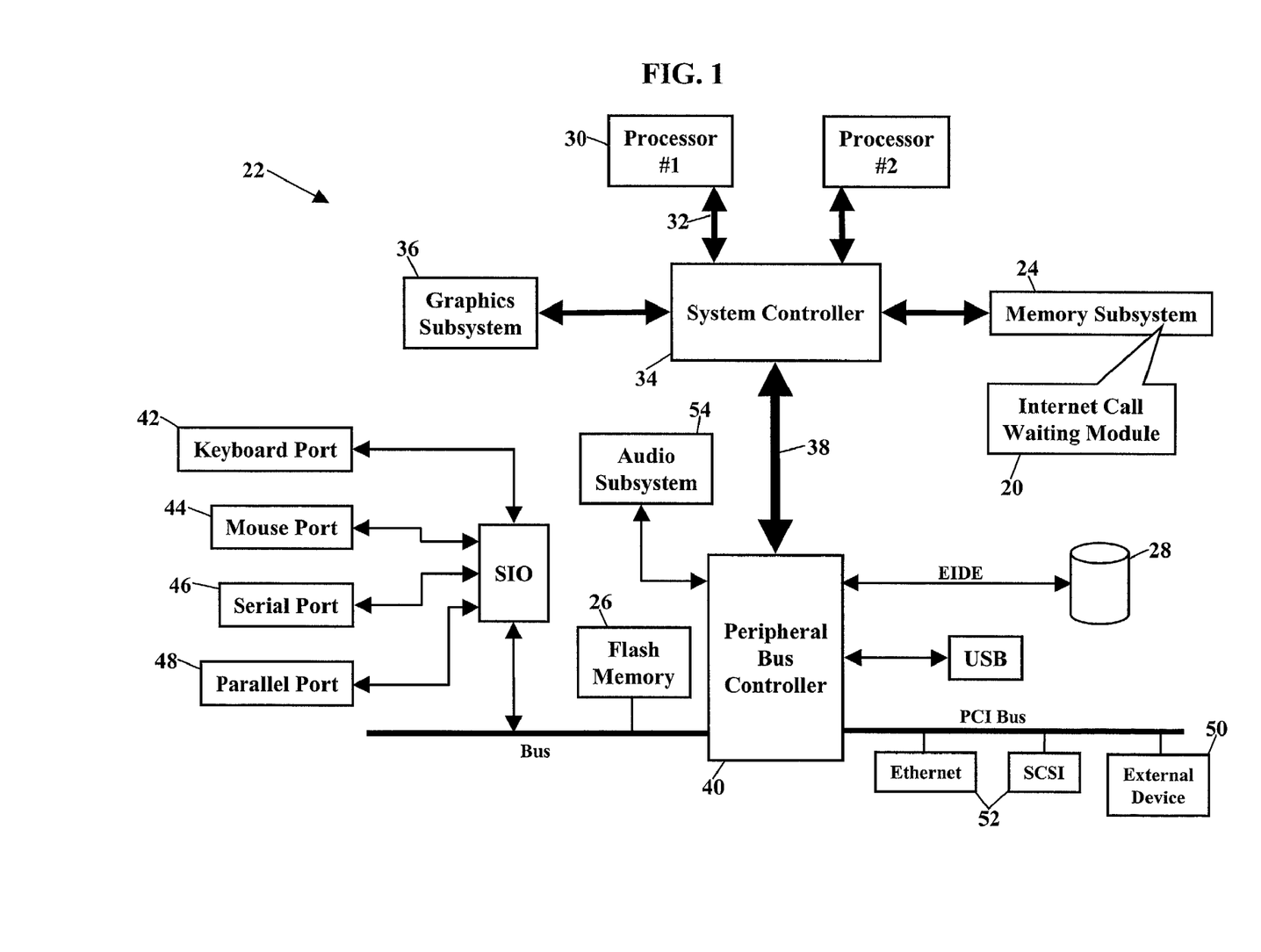
FIG. 1 is a block diagram showing the Internet Call-Waiting Client Module residing in a computer system.
Figure 2:
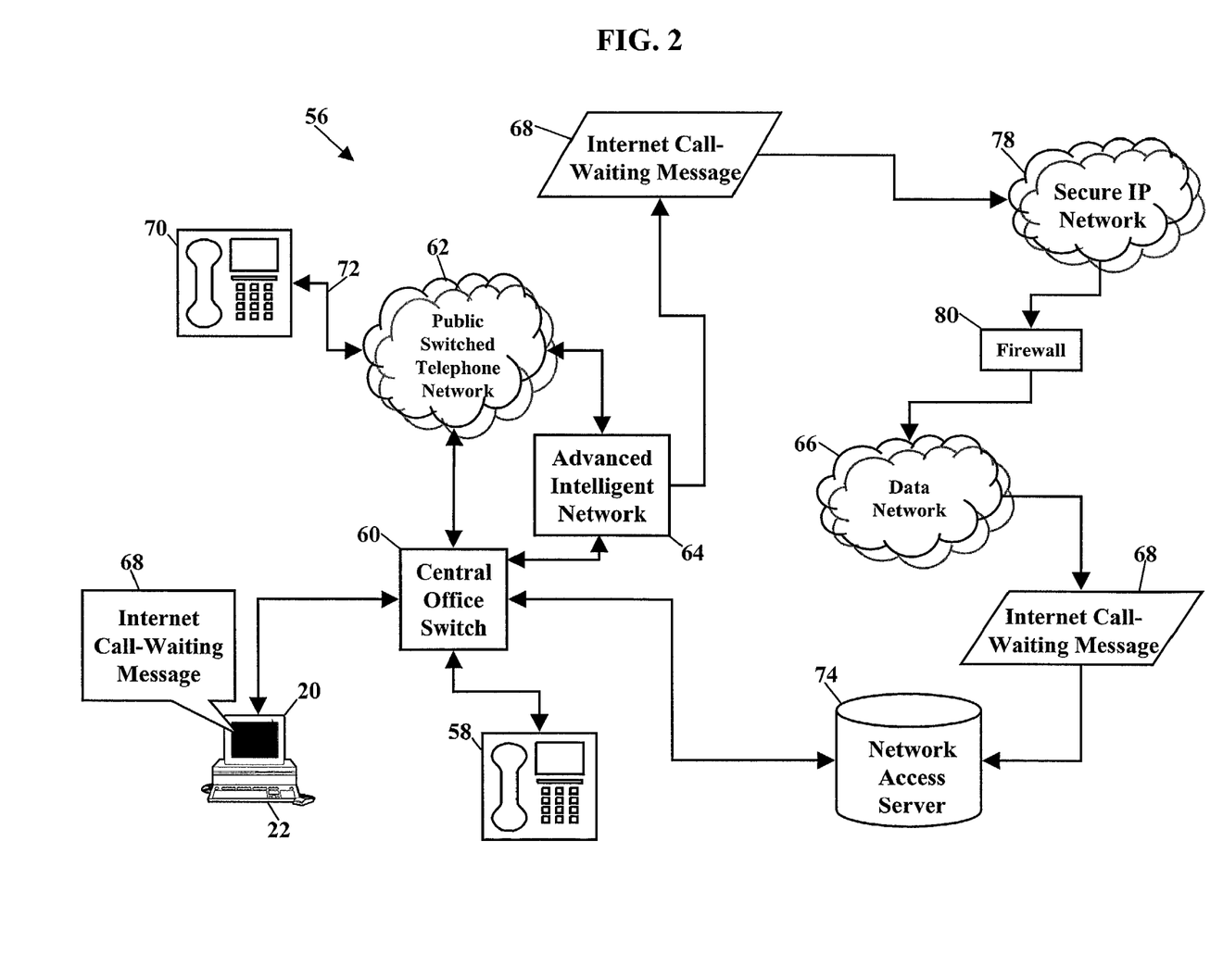
FIG. 2 is a schematic diagram of a telecommunications system.

FIGS. 1 and 2 depict possible operating environments for an embodiment of the present invention. This embodiment of an Internet Call-Waiting Client Module 20 comprises a computer program that allows a subscribing user to customize Internet Call-Waiting messages. When an Internet Call-Waiting message is received, the subscriber may augment the message with additional information representing the calling party. The Internet Call-Waiting Client Module then allows the subscriber to save the augmented additional information. The next time an Internet Call-Waiting message is received from the same calling party, the Internet Call-Waiting Client Module retrieves the additional information and visually and/or audibly presents the additional information to the subscribing user. As those of ordinary skill in the art of computer programming recognize, computer processes/programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those skilled in the art of computer programming, to convey the discoveries in the art.

FIG. 1 is a block diagram showing the Internet Call-Waiting Client Module 20 residing in a computer system 22. The Internet Call-Waiting Client Module 20 operates within a system memory device. The Internet Call-Waiting Client Module 20, for example, is shown residing in a memory subsystem 24. The Internet Call-Waiting Client Module 20, however, could also reside in flash memory 26 or peripheral storage device 28. The computer system 22 also has one or more central processors 30 executing an operating system. The operating system, as is well known, has a set of instructions that control the internal functions of the computer system 22. A system bus 32 communicates signals, such as data signals, control signals, and address signals, between the central processor 30 and a system controller 34 (typically called a "Northbridge"). The system controller 34 provides a bridging function between the one or more central processors 30, a graphics subsystem 36, the memory subsystem 24, and a PCI (Peripheral Controller Interface) bus 38. The PCI bus 38 is controlled by a Peripheral Bus Controller 40. The Peripheral Bus Controller 40 (typically called a "Southbridge") is an integrated circuit that serves as an input/output hub for various peripheral ports. These peripheral ports could include, for example, a keyboard port 42, a mouse port 44, a serial port 46 and/or a parallel port 48 for a video display unit, one or more external device ports 50, and networking ports 52 (such as SCSI or Ethernet). The Peripheral Bus Controller 40 could also include an audio subsystem 54. Those of ordinary skill in the art understand that the program, processes, methods, and systems described in this patent are not limited to any particular computer system or computer hardware.

Those of ordinary skill in the art also understand the central processor 30 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450). The Intel Corporation also manufactures a family of X86 and P86microprocessors (Intel Corporation, 2200 Mission College Blvd., Santa Clara, Calif. 95052-8119, 408,765,8080). Other manufacturers also offer microprocessors. Such other manufacturers include Motorola, Inc. (1303East Algonquin Road, P.O. Box A3309 Schaumburg, Ill. 60196), International Business Machines Corp. (New Orchard Road, Armonk, N.Y. 10504, (914) 499-1900), and Transmeta Corp. (3940 Freedom Circle, Santa Clara, Calif. 95054). Those skilled in the art further understand that the program, processes, methods, and systems described in this patent are not limited to any particular manufacturer's central processor.

The preferred operating system is WINDOWS® (a registered trademark of Microsoft Corporation. One Microsoft Way. Redmond Wash. 98052-6399). Other operatina systems. however, are also suitable. Such other operatina systems would include the UNIX® operating system (UNIX® is a registered trademark of the Open Source Group), the UNIX®-based Linux operating system. WINDOWS NT®. and MAC® OS (a registered trademark of Apple Computer, Inc., I Infinite Loop, Cupertino, Calif. 95014, 408.996.1010)

Those of ordinary skill in the art again understand that the program, processes, methods, and systems described in this patent are not limited to any particular operating system.

The system memory device (shown as memory subsystem 24, flash memory 26, or peripheral storage device 28) may also contain an application program. The application program cooperates with the operating system and with a video display unit (via the serial port 46 and/or the parallel port 48) to provide a Graphical User Interface (GUI). The Graphical User Interface typically includes a combination of signals communicated along the keyboard port 42 and the mouse port 44. The Graphical User Interface provides a convenient visual and/or audible interface with a user of the computer system 22.

FIG. 2 is a schematic diagram of a telecommunications system 56. This telecommunications system 56 further represents an operating environment for the Internet Call-Waiting Client Module 20. The Internet Call-Waiting Client Module 20 is shown operating within the memory (such as memory subsystem 24, flash memory 26, or peripheral storage device 28 shown in FIG. 1) of the computer system 22. The Internet Call-Waiting Client Module 20 could alternatively operate with the memory of an Internet Protocol (IP) phone 58. The telecommunications system 56 includes the familiar central office switch 60 of the Public Switched Telephone Network 62 and Advanced Intelligent Network (AIN) componentry 64 controlling many features of the central office switch 60. The telecommunications system 56 may also interface with a data network 66. The interactions between the central office switch 60, the Public Switched Telephone Network 62, the Advanced Intelligent Network 64, and the data network 66, however, are well understood and will only be simply described. If a reader desires a more detailed explanation, the reader is directed to U.S. Pat. No. 5,430,719 issued to Weisser (Jul. 4, 1995) and to U.S. Pat. No. 5,917,817 issued to Dunn et al. (Jun. 29, 1999).

FIG. 2 illustrates the generation of an Internet Call-Waiting message 68. The Internet Call-Waiting message 68 is generated when the called station has an already-established connection to the data network 66 over their telephone line. The term "calling station" shall hereinafter refer to both the calling party and the calling telephonic equipment. The term "called station" shall hereinafter refer to both the called party and to the terminal equipment of the called party. Because the called station has an established connection to the data network 66, the term "calling station" would include the computer system 22 connected to the data network 66. The term "calling station" would also include the Internet Protocol phone 58. The Internet Call-Waiting feature, however, is known and will only be simply described. If a reader desires a more detailed explanation, the reader is directed to U.S. Pat. No. 5,805,587, issued to Norris et al. (Sep. 8, 1998).

As FIG. 2 shows, the calling station places a call using a telephonic device. As those of ordinary skill in the art of telephony understand, the telephonic device could be a common telephone, a wireless telephone, a wireless personal data assistant, or a wireless pager. FIG. 2, for simplicity, routes the call from a telephone 70, along a landline 72, and into the Public Switched Telephone Network 62. If, on the other hand, the calling station is a wireless device, the call is wirelessly coupled to an antenna (not shown), then coupled to a mobile switch (also not shown), and then routed into the Public Switched Telephone Network 62. The Public Switched Telephone Network 62 routes the call to the local central office switch 60 serving the called station.

The called station, however, has an established connection to the data network 66. The computer system 22, for example, is connected to the data network 66 (most commonly the Internet distributed computing network) via a connection to a network access server 74. This network access server 74 provides access to the data network 66. Because the called station has, therefore, a "busy" status, the calling station would ordinarily receive a busy signal. If, however, the called station subscribes to a call-waiting feature, the Advanced Intelligent Network (AIN) suspends the call and the Internet Call-Waiting message 68 is generated. This Internet Call-Waiting message 68 is packetized and sent along a secure Internet Protocol network 78, through a firewall 80 limiting access to the secure Internet Protocol network 78, and then routed into the data network 66. The Internet Call-Waiting message 68 is targeted to the Internet Protocol address of the calling station. The Internet Call-Waiting message 68 routes through the local central office switch 60 and is delivered to the called station (shown as the computer system 22). This Internet Call-Waiting message 68 usually contains the telephone number of the calling station. The called station, such as the computer system 22, then receives the Internet Call-Waiting message 68 and displays the Internet Call-Waiting message 68 to the user. The Internet Call-Waiting message 68 is a notification that alerts the user of the incoming call. Because the Internet Call-Waiting message 68 includes the telephone number of the calling station, the Internet Call-Waiting message 68 notification typically displays the telephone number of the calling station. The user may then terminate the connection to the data network 66 and accept the telephone call. The user could alternatively decline the incoming call and maintain the connection to the data network.

Figure 3:
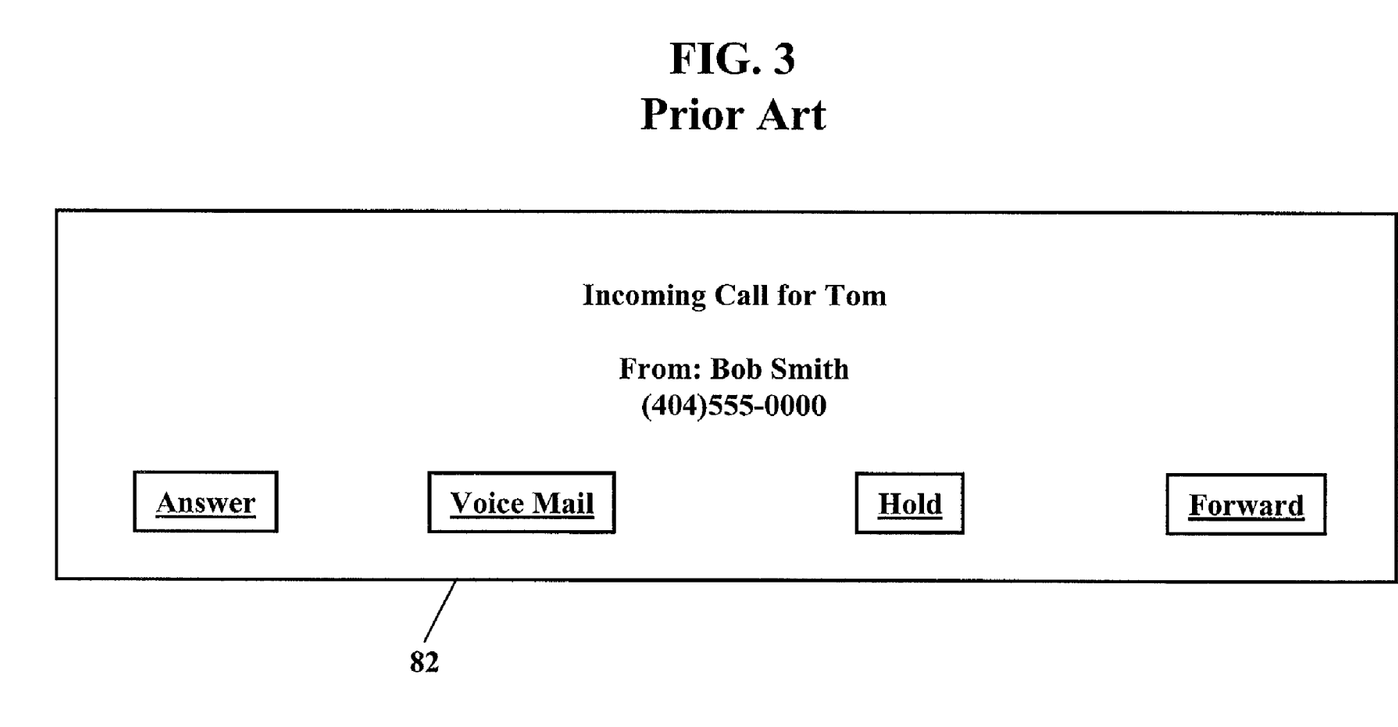
FIG. 3 is a schematic showing a typical prior art notification.

FIG. 3 is a schematic showing a typical prior art Internet Call-Waiting message notification 82. This prior art notification 82 is usually a "pop-up" user interface icon that appears on a video display of the computer system (shown as reference numeral 22 in FIG. 1). This prior art notification 82 is displayed whenever an incoming call is received. The prior art notification 82 often gives the user of the computer system 22 an option to accept the call, send the call to voice mail, hold the call, or forward the call. The call is processed according to the user's selection.

Figure 4:
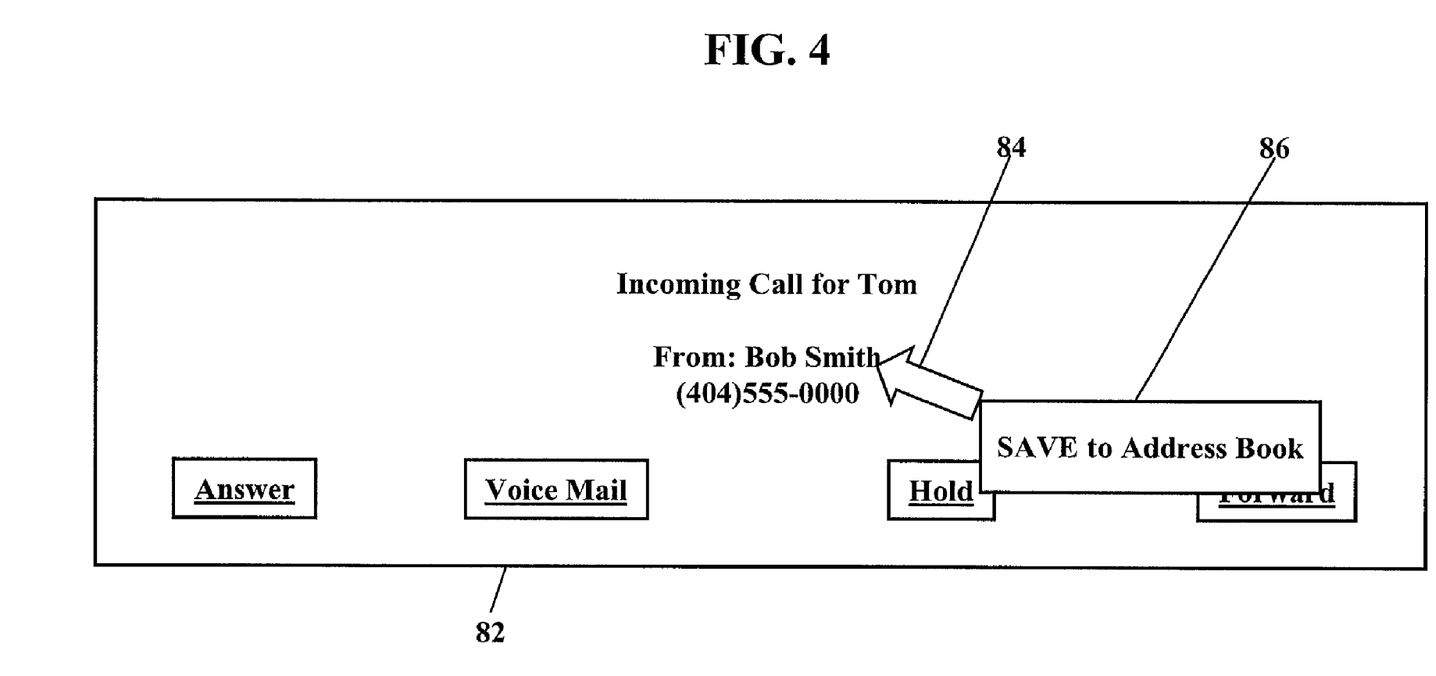
FIGS. 4-7 are schematics illustrating an enhanced notification of the present invention.
Figure 5:
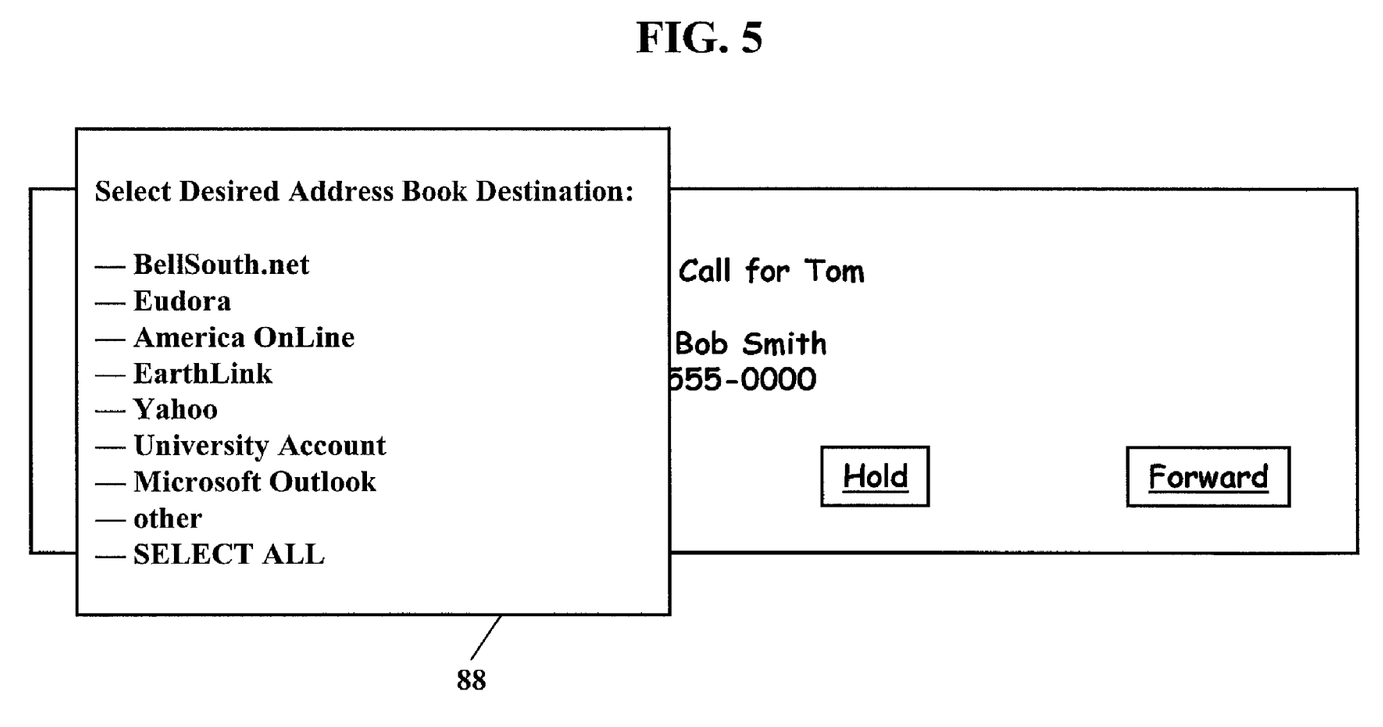
Figure 6:
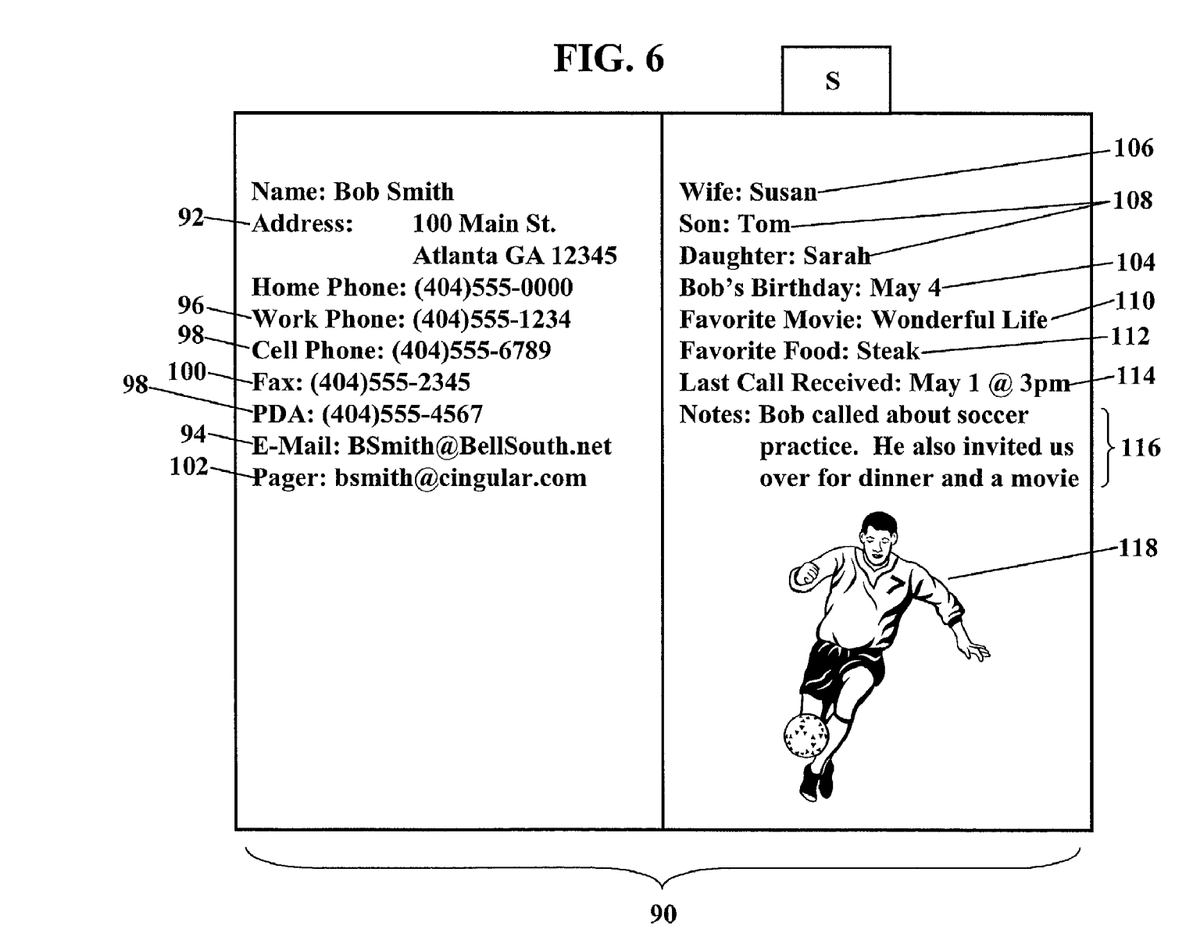

FIGS. 4-6 are schematics illustrating an enhanced user interface notification of the present invention. The Internet Call-Waiting Client Module (shown as reference numeral 20 in FIGS. 1 and 2) of the present invention, operating within the system memory device (shown as memory subsystem 24, flash memory 26, peripheral storage device 28 in FIG. 1) of the computer system (shown as reference numeral 22 in FIGS. 1 and 2), allows the user to enhance and customize the notification. FIG. 4 shows, for example, that the user could place a cursor 84 on the "From: Bob Smith" field, and the Internet Call-Waiting Client Module would produce a prompt 86. FIG. 4, for example, shows Internet Call-Waiting Client Module prompting the user to save the notification 82 to an address book. FIG. 5 shows a graphical prompt 88 produced by the Internet Call-Waiting Client Module, with the graphical prompt 88 allowing the user to select where the enhanced notification will be saved. The graphical prompt 88 would allow the user to save the enhancements to a local memory device, such as a hard disk peripheral device on the computer system. The graphical prompt 88 could also allow the user to save the enhancements to a remote destination, such as a server on the data network (shown as reference numeral 66 in FIG. 2). FIG. 5 shows, for example, that the user could locally and/or remotely maintain several address books on popular networks, such as BellSouth.net, America Online, Yahoo, and many other networks.

FIG. 6 is a schematic showing data fields entered by the user/subscriber. As FIG. 6 shows, the Internet Call-Waiting Client Module (shown as reference numeral 20 in FIG. 1) allows the user/subscriber of the called station to augment the notification (shown as reference numeral 82 in FIG. 4) with additional information 90 representing the calling party. Once the additional information 90 is saved to a local memory device, or to a server/memory destination on the data network (shown as reference numeral 66 in FIG. 2), the Internet Call-Waiting Client Module may then retrieve the additional information 90 the next time a call-waiting notification is received from the calling station.

FIG. 6 shows some additional information 90 that the user/subscriber may augment. The user/subscriber, for example, may enhance the call-waiting notification with a physical address 92 of the calling party or a description of the calling station. If the calling station is a personal data assistant, or other wireless device, the user/subscriber may add data fields explaining the call originates from the calling party's wireless device. The Internet Call-Waiting Client Module could also allow the user/subscriber to associate an e-mail address 94, a work phone number 96, various wireless phone numbers 98, a facsimile number 100, and even a pager number 102 with the calling party or the calling station. The Internet Call-Waiting Client Module, however, also allows the user to enhance the call-waiting notification with the birthday 104 of the calling party or the birthdays of any member of the calling party's family. The Internet Call-Waiting Client Module could also allow the user/subscriber to add the names of a spouse/partner 106, the names of children 108, or the names of other family members or friends. The user/subscriber could also add personal preferences of the calling party, such as a favorite movie 110 and/or a favorite food 112. The Internet Call-Waiting Client Module could also track the last date and time 114 a call was received from the same calling party or the same calling station. The user/subscriber could even add notes 116 of previous conversations. The Internet Call-Waiting Client Module could also display a picture file 118 of the calling party or associated with the calling party or the calling station. The additional information 90, in short, could be any information the user might desire to enhance the call-waiting notification.

Figure 7:
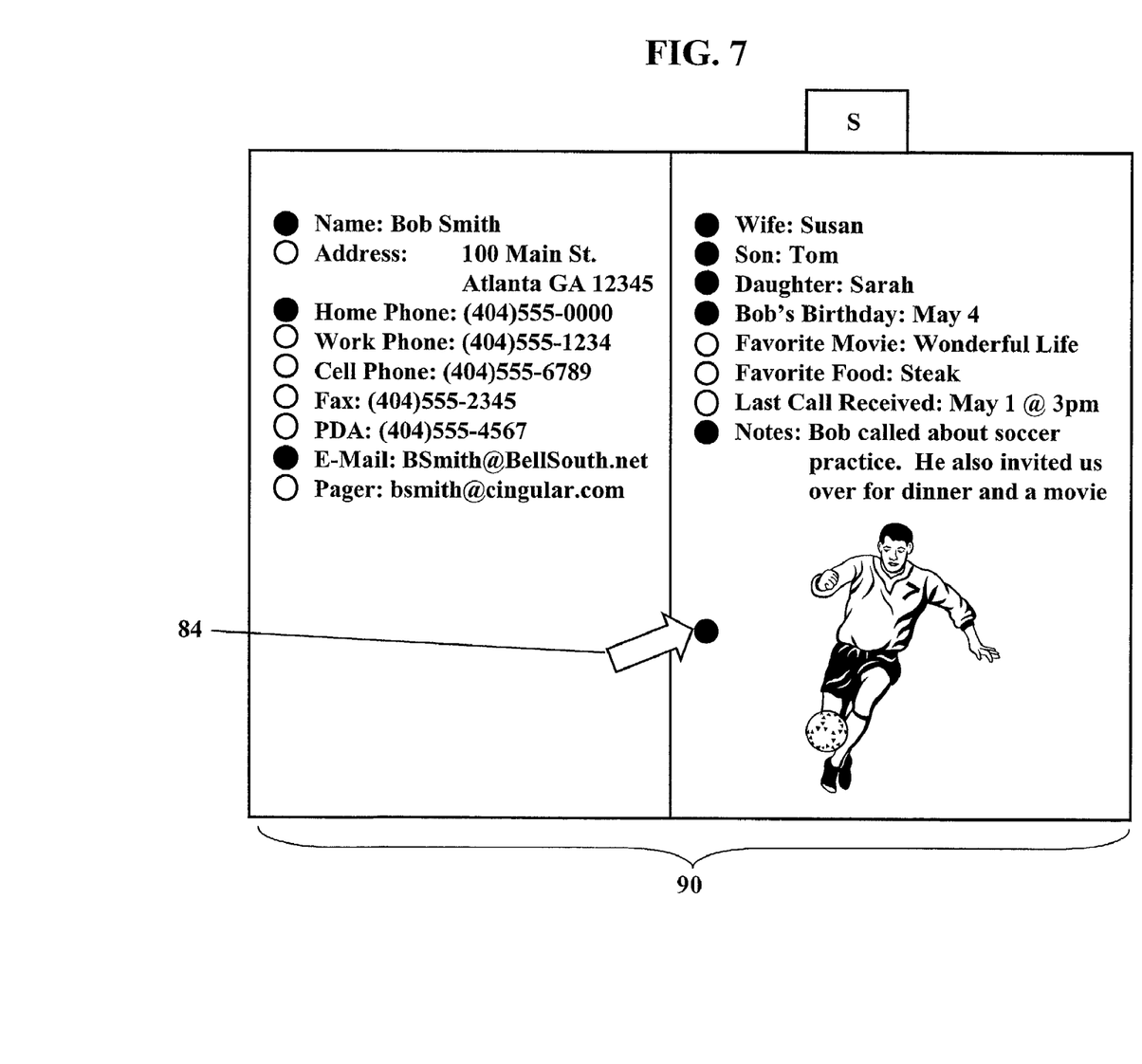

Because the additional information 90 could be of any character, the Internet Call-Waiting Client Module may allow the user/subscriber to select which data fields are presented during a call-waiting notification. FIG. 7, then, is a schematic showing the user/subscriber may select the desired data fields to be presented. The user/subscriber, for example, could place the cursor 84 within the desired data field and "click" to add or to remove the data field from the call-waiting notification.

Figure 8:
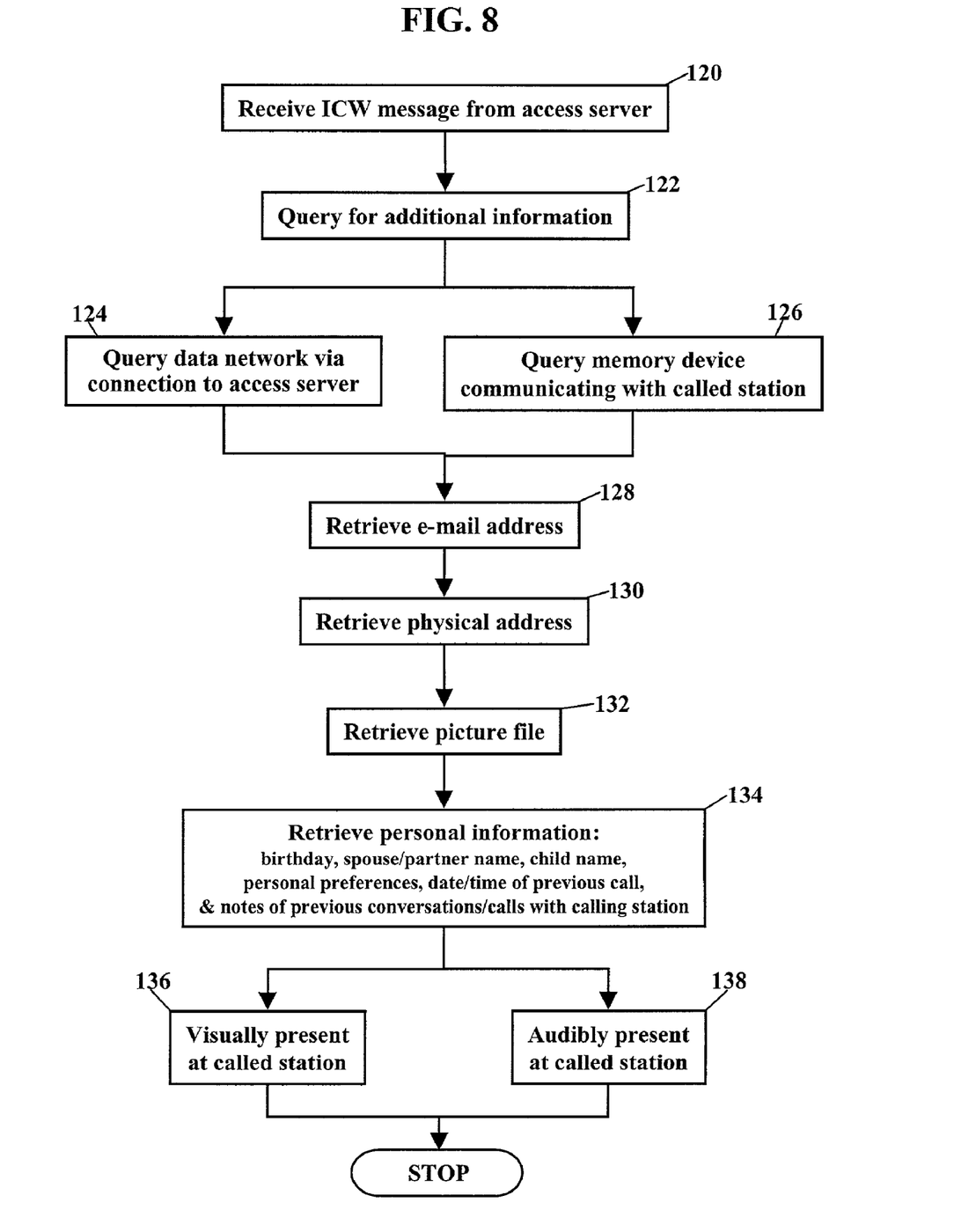
FIG. 8 is a flowchart showing one embodiment of the Internet Call-Waiting Client Module.

FIG. 8 is a flowchart showing one embodiment of the Internet Call-Waiting Client Module (shown as reference numeral 20 in FIG. 1). This embodiment notifies a called station of an incoming call. The called station has a "busy" status as a result of a connection to a data network via an access server. An Internet Call-Waiting message is received from the access server (Block 120). The Internet Call-Waiting message may include information representing the telephone number of the calling station. The Internet Call-Waiting Client Module queries for additional information representing the calling station (Block 122). The Internet Call-Waiting Client Module may query for additional information from the data network via the connection to the access server (Block 124). The Internet Call-Waiting Client Module may also query for additional information from a memory device communicating with the called station (Block 126). The Internet Call-Waiting Client Module may, for example, retrieve an e-mail address (Block 128), retrieve a physical address (Block 130), and/or retrieve a picture file (Block 132). The Internet Call-Waiting Client Module could also retrieve personal information (Block 134) including at least one of a birthday, a name of a spouse/partner, a name of a child, personal preferences of the calling party, the date of a previous phone call, the time of a previous phone call, and notes of previous conversations with the calling station. Some or all of the additional information could be visually presented at the called station (Block 136) on a video or text display. Some or all of the additional information could also be processed by a text-to-speech device (such as the audio subsystem shown as reference numeral 54 in FIG. 1) and then audibly presented (Block 138) at the called station. The additional information notifies the user of the incoming call.

Figure 9:
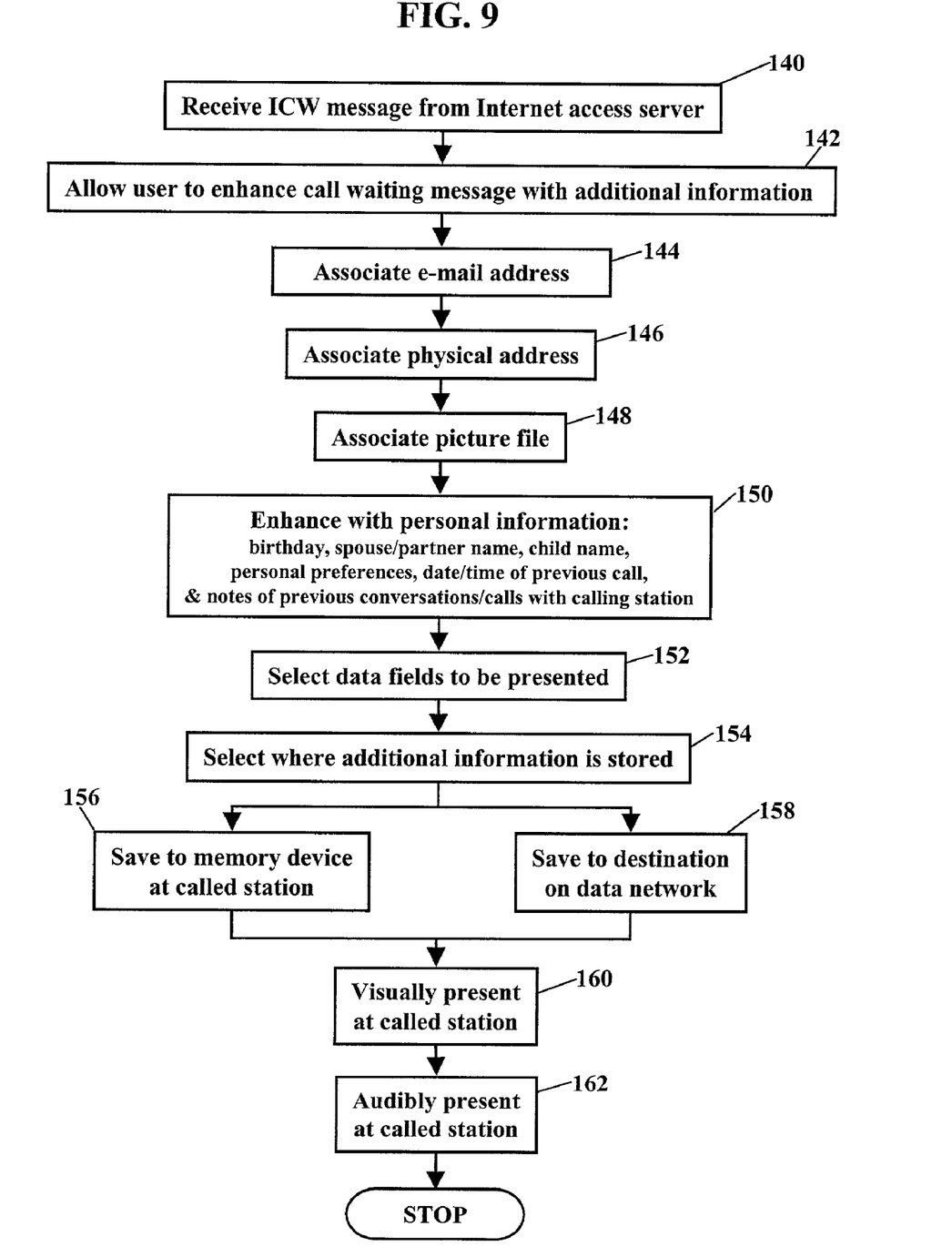
FIG. 9 is a flowchart showing another embodiment of the Internet Call-Waiting Client Module.

FIG. 9 is a flowchart showing another embodiment of the Internet Call-Waiting Client Module (shown as reference numeral 20 in FIG. 1). This embodiment also notifies a called station of an incoming call. An Internet Call-Waiting message is received from an Internet access server (Block 140). The Internet Call-Waiting Client Module allows a user of the called station to enhance the Internet Call-Waiting message with additional information (Block 142). The Internet Call-Waiting Client Module, for example, allows the user to associate an e-mail address with the calling station (Block 144), associate a physical address with the calling station (Block 146), and associate a picture file with the calling station (Block 148). The user could also enhance the Internet Call-Waiting message with personal information (Block 150). This personal information could include at least one of birthday, name of spouse/partner, name of child, personal preferences of the calling station, the date of the last phone call, the time of the last phone call, and notes of previous calls with the calling station. The Internet Call-Waiting Client Module could also allow the user to select which data fields of the additional information will be presented (Block 152) when a future Internet Call-Waiting message is received from the calling station. The Internet Call-Waiting Client Module may also allow the user to select where the additional information will be stored (Block 154). The user, for example, may select a memory device on the called station (Block 156) and/or a destination on the data network (Block 158). The selected data fields are then visually (Block 160) and/or audibly (Block 162) presented at the calling station.

Another embodiment of the present invention would provide Internet Call-Waiting service to a subscriber/customer. The subscriber/customer is permitted or is allowed to enhance an Internet Call-Waiting message with additional information. This additional information would then be visually and/or audibly presented with the Internet Call-Waiting message.

The Internet Call-Waiting Module (shown as reference numeral 20 in FIG. 1) may be physically embodied on or in a computer-readable medium. This computer-readable medium may include CD-ROM, DVD, tape, cassette, floppy disk, memory card, and large-capacity disk (such as IOMEGA(, ZIP(, JAZZ(, and other large-capacity memory products (IOMEGA(, ZIP(, and JAZZ(are registered trademarks of Iomega Corporation, 1821 W. Iomega Way, Roy, Utah 84067, 801.332.1000, HYPERLINK http://www.iomega.com) www.iomega.com). This computer-readable medium, or media, could be distributed to end-users, licensees, and assignees. These types of computer-readable media, and other types not mention here but considered within the scope of the present invention, allow the Internet Call-Waiting Module to be easily disseminated. A computer program product for enhancing Internet Call-Waiting messages with additional information comprises the computer-readable medium and the Internet Call-Waiting Module. The Internet Call-Waiting Module is stored on the computer-readable medium.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method of notifying a called station of an incoming call, the called station being busy as a result of a connection to a data network, the method comprising:

receiving an Internet Call-Waiting message that provides an option to terminate the connection and to accept the incoming call, the Internet Call-Waiting message including information representing a telephone number of a calling station;

prompting to save the Internet Call-Waiting message to an address book;

receiving a user's enhancements to the Internet Call-Waiting message, the enhancements comprising data fields added by the user to the Internet Call-Waiting message, the data fields containing information that enhances the Internet Call-Waiting message;

saving the enhancements to the Internet Call-Waiting message; and when another incoming call is received from the calling station. then retrieving the user's enhancements and presenting the enhancements at the called station in another Internet Call-Waiting message.

2. A method of notifying a called station of an incoming call according to claim 1, wherein retrieving the user's enhancements includes retrieving an e-mail address and presenting the email address with the another Internet Call-Waiting message.

3. A method of notifying a called station of an incoming call according to claim 1, wherein retrieving the user's enhancements includes retrieving a physical address and presenting the physical address with the Internet Call-Waiting message.

4. A method of notifying a called station of an incoming call according to claim 1, wherein retrieving the user's enhancements includes retrieving a picture file and presenting the picture file with the Internet Call-Waiting message.

5. A method of notifying a called station of an incoming call according to claim 1, wherein presenting the enhancements at the called station includes visually presenting the enhancements.

6. A method of notifying a called station of an incoming call according to claim 1, wherein presenting the enhancements at the called station includes audibly presenting the enhancements.

7. A method of notifying a called station of an incoming call according to claim 1, wherein retrieving the user's enhancements includes retrieving the enhancements from the data network.

8. A method of notifying a called station of an incoming call according to claim 1, wherein retrieving the user's enhancements includes retrieving the enhancements from a memory device communicating with the called station.

9. A system, comprising:

means for receiving an Internet Call-Waiting message that provides an option to terminate a connection and to accept an incoming call, the Internet Call-Waiting message including information representing a telephone number of a calling station:

means for prompting to save the Internet Call-Waiting message to an address book:

means for receiving a user's enhancements to the Internet Call-Waiting message the enhancements comprising data fields added by the user to the Internet Call-Waiting message, the data fields containing information that enhances the Internet Call-Waiting message;

means for saving the enhancements to the Internet Call-Waiting message; and when another incoming call is received from the calling station then means for retrieving the user's enhancements and presenting the enhancements at the called station in another Internet Call-Waiting message.

10. A system according to claim 9, further comprising means for associating an e-mail address with the calling station.

11. A system method according to claim 9, further comprising means for associating a physical address with the calling station.

12. A system according to claim 9, further comprising means for associating a picture file with the calling station.

13. A system according to claim 9, further comprising means for allowing the user to select a memory device where the enhancements will be stored.

14. A system according to claim 9, further comprising mans for allowing the user to select a destination on a data network where the enhancements be stored.

15. A system according to claim 9, further comprising means for retrieving a picture file and presenting the picture file with the another Internet Call-Waiting message.

16. A system according to claim 9, further comprising receiving the user's selection of which of the data fields will be presented in the another Internet Call-Waiting message.

17. A system according to claim 16, further comprising presenting the selected data fields at the called station.

18. A computer program product comprising processor-executable instructions for performing a method of enhancing Internet Call-Waiting messages, the method comprising:

receiving an Internet Call-Waiting message that provides an option to terminate a connection and to accept an incoming call, the Internet Call-Waiting message including information representing a telephone number of a calling station:

prompting to save the Internet Call-Waiting message to an address book: receiving a user's enhancements to the Internet Call-Waiting message. the enhancements comprising data fields added by the user to the Internet Call-Waiting message, the data fields containing information that enhances the Internet Call-Waiting message;

saving the enhancements to the Internet Call-Waiting message; and when another incoming call is received from the calling station, then retrieving the user's enhancements and presenting the enhancements at the called station in another Internet Call-Waiting message.

* * * * *